Dec. 9, 1924.
I. W. GRIFFITH ET AL
1,518,918
NUT LOCK
Filed Sept. 22, 1923
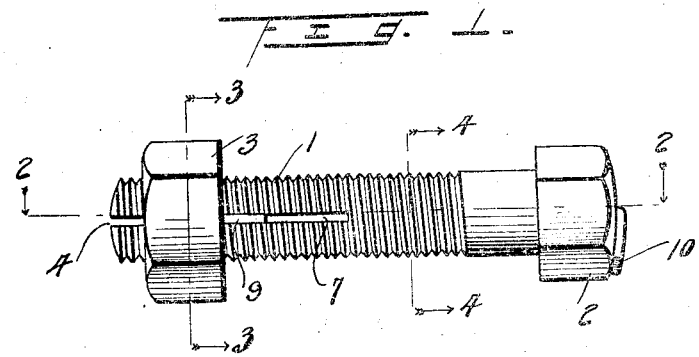
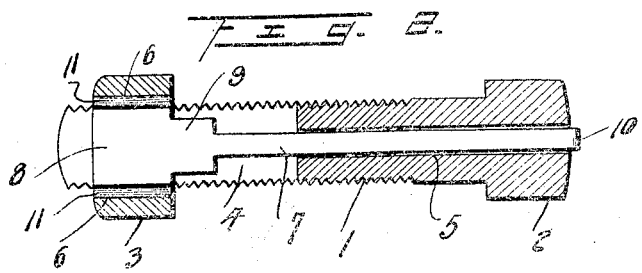
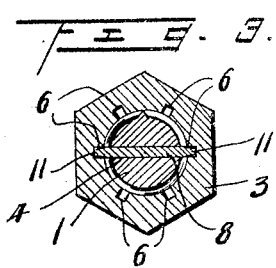
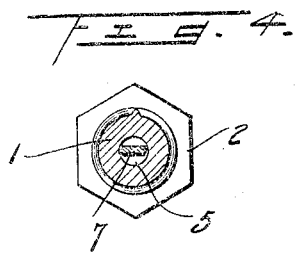
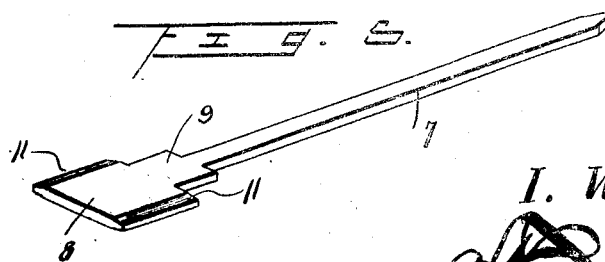
Inventor
I. W. Griffith,
+ T. E. Dohoney.
By
Attorney Patented Dec. 9, 1924.

1,518,918

UNITED STATES PATENT OFFICE.

ISAAC W. GRIFFITH AND THOMAS E. DOHONEY, OF JOHNSTOWN, PENNSYLVANIA.

NUT LOCK.

Application filed September 22, 1923. Serial No. 664,268.

*To all whom it may concern:*

Be it known that we, ISAAC W. GRIFFITH and THOMAS E. DOHONEY, citizens of the United States, residing at Johnstown, in the county of Cambria and State of Pennsylvania, have invented certain new and useful Improvements in Nut Locks; and they do hereby declare the following to be a full, clear, and exact description of the invention, such as will enable others skilled in the art to which it appertains to make and use the same.

The object of the present invention is the securement of the nut upon a bolt or like part to prevent displacement thereof and to maintain the required adjusted position of the nut.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view of a bolt having the nut thereon secured by locking means embodying the invention, Figure 2 is a central longitudinal section of the bolt on the line 2—2 of Figure 1, Figure 3 is a transverse sectional view on the line 3—3 of Figure 1, Figure 4 is a detail sectional view on the line 4—4 of Figure 1, and Figure 5 is a detail perspective view of the locking key.

Corresponding and like parts are referred to in the following description and designated in the several views of the drawings by like reference characters.

The numeral 1 designates a bolt having a head 2 at one end and threaded for the major portion of its length to receive a nut 3. A diametrical kerf 4 is formed in the threaded end of the bolt and extends longitudinally thereof a determinate distance so as to be comprised within the range of adjustment of the nut 3. An axial opening 5 extends from the inner end of the kerf 4 through the head of the bolt. The bolt opening of the nut 3 is provided upon its inner side with a plurality of grooves 6 which are adapted to register with the diametrical kerf 4 in different adjusted positions of the nut. Any number of grooves 6 may be provided and the same may be spaced apart any determinate distance to allow for nicety of adjustment of the nut 3.

The locking key comprises a stem 7 having a head at one end including an outer wide portion 8 and an inner narrow portion 9, the latter coming within the threaded sides of the bolt, whereas the part 8 projects beyond the threaded sides of the bolt to enter oppositely disposed grooves 6 in line with the diametrical kerf 4, thereby locking the nut from movement in either direction. The sides of the projecting portion of the part 8 are beveled to facilitate their entrance into the grooves 6. The key is preferably flat throughout its extent, thereby admitting of its formation from sheet metal by being struck therefrom. However, it is obvious that the key may be of any construction.

In applying the invention, the nut 3 is screwed upon the bolt 1 or like part to the required adjusted position, so that opposed grooves 6 register with the diametrical groove 4. The key is now placed in position by passing the stem 7 through the kerf 4 and opening 5 and moving the same to a position so that the wide portion 8 of the head is disposed within the nut 3 with the projecting edges thereof entering the grooves 6 in register with the kerf 4. The end of the stem 7 projecting beyond the head of the bolt is bent laterally against the latter, as indicated at 10 in Figure 1, thereby preventing outward displacement of the key, inward movement of the key being prevented by the shoulders 11 at the inner end of the part 8 engaging the part, not shown, to which the bolt may be applied. By straightening the bent end 10 of the key, the latter may be readily removed, thereby admitting of repeated use of the bolt and nut lock.

What is claimed is:

1. In combination, a bolt having a kerf in its threaded end and provided with a longitudinal opening extending from the inner end of the kerf through the opposite end of the bolt, a nut mounted upon the threaded end of the bolt and having grooves in the inner side of the bolt opening to register with the said kerf, and a key comprising a stem having a head at one end, the latter lying within the kerf of the bolt and projecting beyond the threaded side to enter grooves of the nut in register with the kerf, and said stem extending through the opening of the bolt and adapted to have the projecting end bent laterally against the bolt to prevent outward displacement of the key.

2. In combination, a bolt having a diametrical kerf extending longitudinally thereof a determinate distance and provided with an exial opening extending from the inner end of the kerf through the headed end of the bolt, a nut mounted upon the bolt and provided upon the inner side of the bolt opening with a plurality of grooves adapted to register with the kerf of the bolt, and a key comprising a stem having a head at one end including a wide portion and a narrow portion, the latter adapted to lie within the threaded sides of the bolt and the wide portion having its opposite edges projecting beyond the threaded sides of the bolt to enter opposed grooves of the nut in register with the diametrical kerf, the stem of the key being adapted to project beyond the headed end of the bolt with the projecting end bent laterally thereagainst.

In testimony whereof they affixed their signatures in presence of two witnesses.

ISAAC W. GRIFFITH.
THOMAS E. DOHONEY.

Witnesses:
JOHN J. MARTIN,
J. P. MINAHAN.